June 28, 1927.

R. SCHUFTAN 1,633,681

FASTENER PARTICULARLY FOR BANDAGES

Filed April 5, 1926

Inventor:
Richard Schuftan
by
Attorney.

Patented June 28, 1927.

1,633,681

UNITED STATES PATENT OFFICE.

RICHARD SCHUFTAN, OF WILMERSDORF, NEAR BERLIN, GERMANY.

FASTENER PARTICULARLY FOR BANDAGES.

Application filed April 5, 1926, Serial No. 99,826, and in Germany April 15, 1925.

The invention relates to a fastener particularly for bandages and consists of two parts provided with oppositely disposed teeth and connected together by an elastic medium. The feature of the invention consists in that the points of the teeth do not project beyond the plane which makes contact with the outer side of the teeth and the associated rib serving to secure the elastic coupling medium. The back of both hook-like forming portions is curved inwardly towards the open side and the teeth lie somewhat parallel to the portion of the back located opposite them, whereby the teeth are prevented from catching into the flesh.

Hitherto it has been customary to choose, with fasteners of the kind in question, a rubber band or a rubber cord as elastic connecting member, but these constructional forms suffer from the drawback that the rubber becomes brittle, especially when having been laid somewhat long in store, as well as in hot countries. Besides, the rubber may be rendered brittle also by the entering of certain substances used in the art of binding up wounds. Doing away also with this drawback is another advantage obtainable by the present invention, this effect being attained by using a metallic spring as elastic member, that spring being, preferably, designed like Nuremberg scissors.

Figure 1:
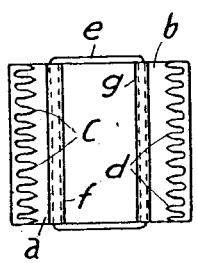
Figure 2:
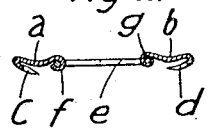
Figure 3:
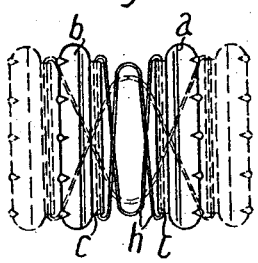

Two examples of embodiment of the invention are shown on the accompanying drawings which show in Fig. 1 a view of the fastening in plan, Fig. 2 a sectional side elevation, Fig. 3 another constructional form in which a spring is used as connecting means.

The fastening consists chiefly of two hook-shaped portions $a$ and $b$ which are made of any suitable material desired, preferably a thin piece of sheet metal is employed. The portions $a$ and $b$ are provided with teeth $c$ and $d$ extending over their entire length. A rubber cord or the like $e$ connects both these portions together and the cord is located in convolutions $f$ and $g$ which are provided on the sides of the portions $a$ and $b$ remote from the teeth $c$ and $d$. Preferably the back of the portions $a$ and $b$, that is the portion which connects the teeth $c$ and $d$ with the convolutions $f$ and $g$ as shown in Fig. 2 is arched or bent and the direction of the teeth $c$ and $d$ is parallel to the corresponding portion of the back. It has been found that the teeth then grip better and more easily.

The device is used in such a manner that after wrapping round a bandage first of all one of the two portions $c$ and $d$ is inserted with its teeth in the bandage cloth whereupon the rubber cord $e$ is stretched round and the other portion with its teeth beyond the end of the bandage fixed in the bandage cloth. The fastening then lies tightly against the bandage, the rubber cord holds the two portions together and prevents loosening. To undo it, it is merely necessary to draw the two portions apart against the rubber cord and to remove the teeth from the bandage material.

The size as well as the length of the portions $a$ and $b$ and the number of teeth and width must be made according to the particular purpose required. For large bandages correspondingly long fastenings are employed, whereas for small bandages, for the fingers for instance, short and narrow fastening portions are chosen. In certain cases one may choose long fastening portions $a$ and $b$ for finger bandages particularly when said fastening portions are to serve as splints for holding the fingers rigid.

The shape of the teeth also depends upon the material in which the teeth are adapted to engage. In the case of loose bandage material sufficiently broad teeth with short points are used, with firmer material lengthy pointed teeth must be employed.

In the modification illustrated in Fig. 3 the fastening is shown in full lines in its position of rest, and in dotted lines in its operative position in which the spring is expanded. The spring $h$ used in this example consists of a bent piece of elastic wire, the shape of which resembles that of Nuremberg scissors. The middle portion of this spring is located in a channel-forming portion $c$ of the fastener member $a$ and the two ends of the spring are located in a similar channel-forming portion $c$ of the fastener member $b$. When these two members are being moved asunder, the spring will assume the position shown in dotted lines in Fig. 3.

This shape of the spring presents over the ordinary helical springs or the like the advantage that the spring can be extended to comparatively great length in spite of its shortness, whereas short helical springs are unduly expanded and rendered inactive already after a comparatively short time, the more, as their diameter can be only small.

The number of the turns or bends of the spring may be chosen at liberty; in general the configuration shown in the drawing will do. Steel is to be preferred as material for the spring, but also brass or other elastic materials may be used, if desired.

The device is suitable not only as a fastening for bandages, but may find use to advantage in holding together materials for a desired purpose as for example a fastening for articles of clothing, particularly as a safety fastening, further for holding together materials in decorating show-windows and further similar instances. In cases in which metal is not suitable for its manufacture the fastening may be made of other materials such as, hard rubber ebonite or the like. Finally instead of the rubber cord $e$ another elastic medium such as one or more springs or the like may be used for connecting the portions $a$ and $b$.

Having now particularly described and ascertained the nature of my said invention and in what manner the same is to be performed I declare that what I claim is:

1. A fastening, particularly for bandages, consisting in combination of two hook shaped members having back portions curved inwardly towards the open side of the hook and oppositely disposed teeth lying somewhat parallel to the inclined portion of the back located opposite thereon; an elastic medium connecting said portions with each other; and means provided on said members serving to secure the elastic medium.

2. A fastening, particularly for bandages, consisting in combination of two hook shaped members having back portions curved inwardly towards the open side of the hook and oppositely disposed teeth lying somewhat parallel to the inclined portion of the back located opposite thereon; an elastic medium connecting said portions with each other, and means provided on said members serving to secure the elastic medium, the hook shank of said members being so formed that the points of the teeth do not project beyond the plane which makes contact with the outer side of the teeth and the associated means.

3. A fastening, particularly for bandages, consisting in combination of two hook shaped members having back portions curved inwardly towards the open side of the hook and oppositely disposed teeth lying somewhat parallel to the inclined portion of the back located opposite thereon; a metallic spring shaped according to a Nuremberg scissors connecting said portions with each other, and means provided on said members serving to secure the metallic spring, the hook shank of said members being so formed that the points of the teeth do not project beyond the plane which makes contact with the outer side of the teeth and the associated means.

In testimony whereof I have affixed my signature.

RICHARD SCHUFTAN.